United States Patent [19]

Werner

[11] Patent Number: 4,836,606
[45] Date of Patent: Jun. 6, 1989

[54] SEAT WITH ADJUSTABLE BACK REST
[75] Inventor: Heinz Werner, Remscheid-Hasten, Fed. Rep. of Germany
[73] Assignee: Keiper Recaro GmbH & Co., Remscheid, Fed. Rep. of Germany
[21] Appl. No.: 216,368
[22] Filed: Jul. 7, 1988
[30] Foreign Application Priority Data Jul. 14, 1987 [DE] Fed. Rep. of Germany ........ 3723204

[51] Int. Cl.$^4$ ............................................... A47C 1/24
[52] U.S. Cl. .................................................... 297/362
[58] Field of Search .................. 297/361, 362; 74/804, 74/805

[56] References Cited

U.S. PATENT DOCUMENTS

| | | | |
|---|---|---|---|
| 4,453,767 | 6/1984 | Walk et al. | 297/362 |
| 4,563,039 | 1/1986 | Jörg | 297/362 |
| 4,708,392 | 11/1987 | Werner | 297/362 |
| 4,715,656 | 12/1987 | Walk et al. | 297/362 |

FOREIGN PATENT DOCUMENTS

| | | | |
|---|---|---|---|
| 2641583 | 3/1978 | Fed. Rep. of Germany | 297/362 |
| 2724047 | 12/1978 | Fed. Rep. of Germany | 297/362 |

Primary Examiner—Peter A. Aschenbrenner
Attorney, Agent, or Firm—Peter K. Kontler

[57] ABSTRACT

A seat for use in a motor vehicle has a base and a back rest which is pivotably connected to the base by two hinge joints each of which has a first leaf connected with the base a second leaf connected to the back rest, and a pintle non-rotatably connected with a discrete lever. The levers have first arms which are received with a certain amount of play in the recess of a hand wheel, and second arms which are acted upon by a spring so as to urge the levers and hence the respective pintles toward predetermined angular positions. This enables the pintles to eliminate play between the mating teeth of gear transmissions which are mounted on the pintles and operate between the leaves of the respective hinge joints. Such elimination of play between mating teeth, and of clearances which are attributable to wear and/or machining or assembling tolerances, is ensured without the need for increasing the magnitude of force which is required to turn the hand wheel in order to change the inclination of the back rest relative to the base of the seat.

24 Claims, 4 Drawing Sheets

SEAT WITH ADJUSTABLE BACK REST

BACKGROUND OF THE INVENTION

The invention relates to improvements in seating facilities in general, and more particularly to improvements in adjustable seats wherein a back rest is pivotable relative to a body supporting portion or base in response to rotation of a driving member which can change the inclination of first leaves of two hinge joints relative to second leaves, the first leaves being secured to the back rest and the second leaves being secured to the base of the seat.

Seats with pivotable or tiltable back rests are disclosed in numerous pending United States patent applications and in numerous United States and foreign patents of the assignee of the present application. Reference may be had, for example, to U.S. Pat. No. 4,708,392 granted Nov. 24, 1987 to Werner et al. for "Hinge joint for the seats of automotive vehicles and the like", and to U.S. Pat. No. 4,715,656 granted Dec. 29, 1987 to Walk et al. for "Hinge joint for the seats of motor vehicles and the like". As a rule, each hinge joint comprises a gear transmission which operates between the respective first and second leaves.

Commonly owned German Offenlegungsschrift No. 27 24 047 of Barthodziej et al. discloses a seat wherein the pintles of the two hinge joints are connected to each other by a torque transmitting shaft so that it suffices to provide a rotary driving member (such as a hand wheel) for one of the pintles whereby the shaft transmits torque from the one pintle to the other pintle. In order to compensate for play between the teeth of mating gears in each of the hinge joints, the shaft which is used in the seat of Barthodziej et al. is assembled of two coaxial sections which are coupled to each other by a sleeve or muff in such a way that the composite shaft can reduce the aforementioned play in each of the gear transmissions and the shaft also reduces the likelihood of staggering or stepwise transmission of motion from the one pintle to the other pintle in response to rotation of the driving member. This is achieved in that the two sections of the shaft are turned relative to each other prior to insertion of their neighboring ends into the sleeve so that such turning of the shaft sections eliminates the play between the teeth of gears in the respective transmissions. Thus, the teeth of one gear in one of the hinge joints bear against the left-hand flanks of the mating teeth, and the teeth of one gear in the other hinge joint bear against the right-hand flanks of the mating teeth. The neighboring end portions of the shaft sections are splined and the sleeve has internal grooves for the splines of the two sections so that the angular positions of the properly assembled shaft sections cannot be changed when the seat embodying such hinge joints is in use. It has been found that the composite shaft can reliably eliminate play between the mating teeth of the two gear transmissions and can also eliminate clearances between rotary parts and their bearings as well as unpredictable (stuttering) transmission of rotary motion from that pintle which is directly connected with the rotary driving member to the other pintle.

A drawback of the proposal of Barthodziej et al. is that the mounting of the shaft sections in the internally grooved sleeve necessitates the application of a greater force in order to change the inclination of the back rest. The problem is compounded by tolerances in the gear transmissions (particularly if the gears are out of round).

OBJECTS AND SUMMARY OF THE INVENTION

An object of the invention is to provide a novel and improved seat wherein the inclination of the back rest can be changed in response to exertion of a relatively small force in spite of the provision of means for reliably eliminating play between mating teeth and for eliminating other stray movements during adjustment of inclination of the back rest.

Another object of the invention is to provide a seat wherein the transmission of torque to the pintles of the hinge joints for the back rest can be carried out smoothly and in exact synchronism.

A further object of the invention is to provide novel and improved means for changing the inclination of the back rest in a seat of the above outlined character.

An additional object of the invention is to provide a novel and improved operative connection between the input element of the means for changing the inclination of the back rest and the pintles of the hinge joints.

Still another object of the invention is to provide a novel and improved method of eliminating play and clearances between the parts of the hinge joints without any, or without appreciable, increase in the magnitude of force which is required to initiate a change of inclination of the back rest.

A further object of the invention is to provide a seat wherein the two hinge joints can be operatively connected to each other by a one-piece shaft.

Another object of the invention is to provide a chair wherein the hinge joints employ novel and improved pintles, novel and improved means for rotating the pintles, and novel and improved means for ensuring smooth and synchronous angular movement of both pintles in response to initiation of a change of inclination of the back rest relative to the base of the seat.

An additional object of the invention is to provide a novel and improved dual or twin hinge joint for use in the above outlined chair.

The invention is embodied in an adjustable seat which can be used with particular advantage in a motor vehicle as a driver's seat, as a seat next to the driver's seat or as any other seat, e.g., in a bus. The improved seat comprises a body supporting portion which can be fixed to or movably mounted on the floor in the passenger compartment or in the cabin of a motor vehicle, a back rest, and first and second hinge joints which adjustably couple the back rest to the body supporting portion. Each hinge joint comprises a first component or leaf which is rigid with the body supporting portion, a second component or leaf which is rigid with the back rest, and a pintle which angularly movably mounts the second component on the respective first component. The pintles are or can be coaxial with each other, and the seat further comprises means for changing the inclination of the back rest relative to the body supporting portion. The inclination changing means includes a rotary driving member (e.g., in the form of a hand wheel), a first torque transmitting element which is non-rotatably mounted on one of the pintles and is rotatable by the driving member, a second torque transmitting element which is non-rotatably mounted on the other pintle and is rotatable by the driving member and is also turnable relative to the first torque transmitting element, and means (such as a tension spring or a torsion spring) for yieldably biasing the torque transmitting elements toward predetermined angular positions relative to each other. Each of the torque transmitting elements can comprise a lever, and each of the pintles comprises a torque-receiving portion (e.g., an eccentric) which is non-rotatably connected with the respective lever. Each hinge joint further comprises a gear transmission between the respective first and second components. For example, one part of each gear transmission can comprise a spur gear with n teeth and the other part of the respective gear transmission then comprises an internal gear mating with the spur gear and having $n+m$ teeth (m is a whole number including one). The driving member can be rotatably mounted on one of the pintles, and each of the aforementioned levers can comprise an arm which is loosely coupled with and can receive torque from the driving member. The driving member can be provided with a recess (e.g., a window extending along a predetermined arc in the circumferential direction of the pintles), and the arms of the two levers then extend into such recess with angular play so that the dimensions of the recess determine the maximum extent of angular movability of the torque transmitting elements and the respective pintles relative to each other. The play between the teeth of the gears which constitute or form part of the transmissions determines the extent of angular movability of the torque transmitting elements relative to each other. In accordance with one presently preferred embodiment, the driving member can include a disc-shaped portion, and the recess for the arms of the levers which form part of or constitute the torque transmitting elements is then provided in such disc-shaped portion.

The two hinge joints can be disposed at opposite sides of the body supporting portion of the seat, or two hinge joints can be provided at one side at least of the body supporting portion.

One of the pintles can be integral with the corresponding torque transmitting element. For example, such pintle can be welded to the respective torque transmitting element. The other pintle can be rotatably mounted on the one pintle. If the two hinge joints are disposed at opposite sides of the body supporting portion of the seat, a first portion of the one pintle can be disposed at the respective side of the body supporting portion and the second portion of the one pintle can extend between the first and second sides of the body supporting portion.

If the driving member comprises the aforementioned disc-shaped portion, it can further comprise a sleeve which is non-rotatably coupled or made integral with the disc-shaped portion and rotatably surrounds the second portion of a two-piece pintle the first portion of which provides a fulcrum for the second component of the respective hinge joint. One of the torque transmitting elements transmits torque to the two-piece pintle, and the other torque transmitting element transmits torque to the other pintle in response to turning of the disc-shaped portion of the driving member.

Each of the aforementioned transmissions can constitute or include a planetary transmission having a sun gear which is non-rotatably connected with the respective pintle, an internal gear which is provided on each of the respective components, and at least one planet pinion which mates with the respective sun gear and with the respective internal gears (i.e., each such planet pinion mates with two internal gears). The internal gears of each planetary transmission have different numbers of teeth.

If the biasing means comprises at least one torsion spring, the arms of the aforementioned levers which constitute or form part of the torque transmitting elements are preferably disposed substantially diametrically opposite each other with reference to the common axis of the pintles and the torsion spring has portions which bear against such arms of the levers. At least one convolution of the torsion spring surrounds one of the pintles. One of the torque transmitting elements can be provided with a pair of stops and the arm of the other torque transmitting element is disposed between such stops and has limited freedom of angular movement relative to the one torque transmitting element in response to dissipation of energy by the torsion spring or as a result of stressing of the torsion spring.

If two hinge joints are disposed at one and the same side of the body supporting portion of the seat, the pintle of the first hinge joint can comprise a shaft and the pintle of the second hinge joint can comprise a sleeve which rotatably surrounds the shaft. The two components of the first hinge joint surround an eccentric of the shaft, one of the torque transmitting elements is non-rotatably connected with the shaft, and the other torque transmitting element is non-rotatably connected with the sleeve. The driving member of such seat is or can be rotatably mounted on the shaft, and the first hinge joint is disposed between the one side of the body supporting portion and the second hinge joint.

The driving member can comprise a prime mover (such as an electric motor) which can be installed beneath or in the body supporting portion between the two hinge joints.

The novel features which are considered as characteristic of the invention are set forth in particular in the appended claims. The improved seat itself, however, both as to its construction and the mode of adjusting the back rest, together with additional features and advantages thereof, will be best understood upon perusal of the following detailed description of certain specific embodiments with reference to the accompanying drawing.

DESCRIPTION OF PREFERRED EMBODIMENTS

Figures 1, 3, 4:
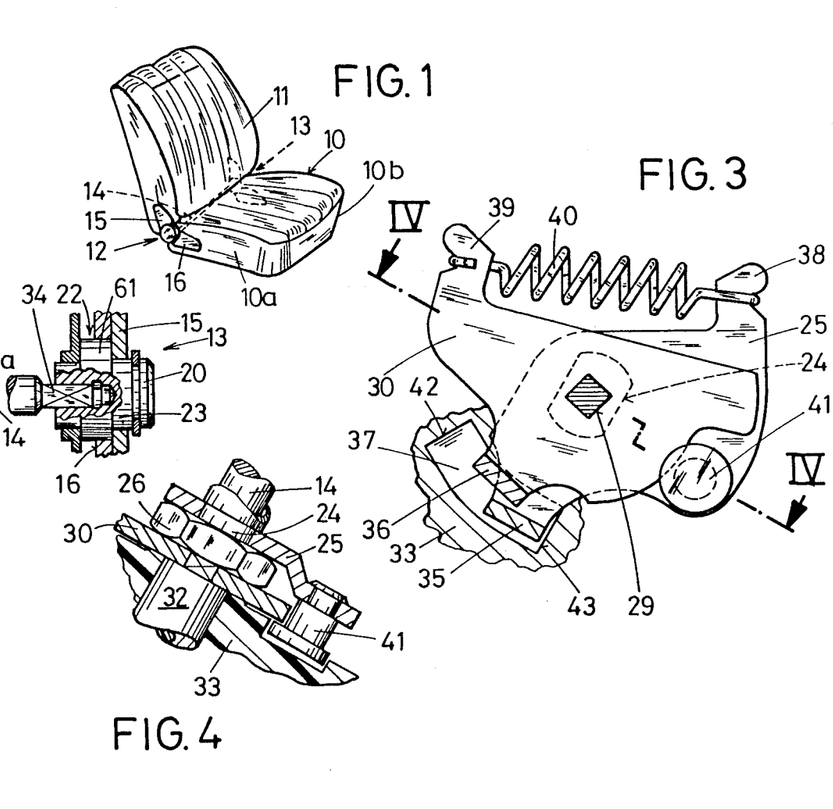
FIG. 1 is a schematic perspective view of a seat wherein the hinge joints and the means for changing the inclination of the back rest relative to the body supporting portion of the seat are constructed and assembled in accordance with a first embodiment of the invention.
FIG. 3 is a sectional view substantially as seen in the direction of arrows from the line III—III of FIG. 2
FIG. 4 is a fragmentary sectional view substantially as seen in the direction of arrows from the line IV—IV of FIG. 3.
Figure 2:
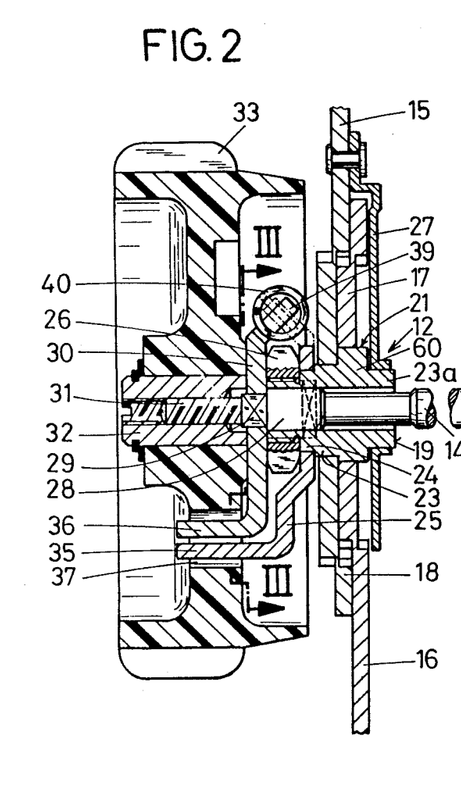
FIG. 2 is an enlarged central sectional view of one of hinge joints and of the driving member, and a fragmentary central sectional view of the other hinge joint in the seat of FIG. 1.

FIG. 1 shows a seat which comprises a body supporting portion or base 10 and a back rest 11. Such types of seats are used in many makes of motor vehicles, for example, as driver's seats and as seats next to the driver's seats. The back rest 11 is pivotally connected to the base 10 by two hinge joints 12 and 13 which are disposed at opposite sides 10a and 10b of the base 10. Each of the hinge joints 12, 13 comprises a first component or leaf 16 which is rigidly affixed to the respective side 10a or 10b of the base 10, and a second component or leaf 15 which is affixed to the respective side of the back rest 11 in a manner not forming part of the present invention. The hinge joint 12 further comprises a pintle 19 which enables the respective pivotable component 15 to turn relative to the associated component 16, and the hinge joint 13 comprises a composite pintle including a first portion 20 which constitutes a fulcrum for the respective second component 15 and a second portion in the form of an elongated shaft 14 which is preferably non-rotatably coupled to the portion 20 and extends all the way from the hinge joint 13 to the hinge joint 12. All necessary details of the hinge joints 12 and 13 are shown in FIG. 2.

Each of the hinge joints 12, 13 further comprises a gear transmission which operates between the respective components 15, 16 and includes a spur gear 17 which constitutes an axially offset portion of the component 16 and an internal gear 18 which constitutes an axially offset portion of the component 15 and mates with the respective spur gear 17. The number of teeth on the internal gear 18 equals m+n wherein n is the number of teeth on the spur gear 17 and m is a whole number including one. Reference may be had, for example, to commonly owned U.S. Pat. No. 4,563,039 granted Jan. 7, 1986 to Jörg for "Hinge joint for use in the seats of motor vehicles and the like". The addendum circle of each spur gear 17 is smaller than the dedendum circle of the respective internal gear 18 and the difference between the diameters of these circles at least equals the radial dimension of a tooth on the gear 17 or 18. The gears 17, 18 can be made by punching, the same as described in the patent to Jörg.

The pintles 19 and 20, 14 of the joints 12, 13 respectively comprise torque receiving portions 21, 22 which respectively include or constitute eccentrics 60 and 61. The eccentrics 60, 61 are or can be integral with the respective torque receiving portions 21, 22. The spur gears 17 of the hinge joints 12, 13 are respectively mounted on the eccentrics 60 and 61. The internal gears 18 are mounted on concentric or coaxial portions 23 of the respective pintles.

The concentric portion 23 of the pintle 19 is adjacent a polygonal portion 24 which is non-rotatably surrounded by a torque transmitting element in the form of a lever 25 having a substantially axially parallel arm 35. A nut 26 mates with an externally threaded portion of the pintle 19 to hold the lever 25 in the axial position shown in FIG. 2. The eccentric 60 is disposed between the concentric portion 23 and a second concentric portion 23a of the pintle 19. The concentric portion 23a is surrounded by a platen 27 which is riveted to and can be said to constitute a portion of the pivotable component 15 of the hinge joint 12. The platen 27 overlies and conceals the spur gear 17 of the fixed component 16 of the hinge joint 12.

The pintle 19 has a through bore whose axis coincides with the common axis of the concentric portions 23 and 23a and rotatably receives a cylindrical portion 28 of the shaft 14 (i.e., of the longer second portion of the pintle 20, 14 of the hinge joint 13). The cylindrical portion 28 is adjacent a polygonal portion 29 which is non-rotatably engaged by a second torque transmitting element 30 in the form of a lever having an axially parallel portion or arm 36 adjacent the portion or arm 35 of the lever 25. The polygonal (e.g., square) portion 29 of the shaft 14 is adjacent an externally threaded end portion or stud 31 of the shaft 14. The stud 31 mates with an internally threaded sleeve 32 which determines the axial position of the lever 30 and serves as a bearing for a hand wheel 33 which constitutes the rotary driving member of the means for changing the inclination of the back rest 11 relative to the base 10. The driving member 33 is rotatable relative to the sleeve 32.

That end portion of the shaft 14 which is remote from the hinge joint 12 is provided with a polygonal stud 34 which is received in a complementary socket of the first portion 20 of the pintle forming part of the hinge joint 13. The driving member 33 can turn the two pintles through the medium of the respective levers 25 and 30 because the arms 35, 36 of these levers are received in a circumferentially extending recess 37 of the driving member. The levers 25, 30 respectively further comprise second arms 38 and 39 (see particularly FIG. 3) which are disposed substantially diametrically opposite the arms 35, 36 (with reference to the common axis of the pintles 19 and 20, 14) and are coupled to each other by a yieldable biasing means 40 in the form of a tension spring. The latter tends to move the levers 25 and 30 to predetermined angular positions relative to each other.

The lever 25 is provided with a circular projection 41 which is disposed between the arms 35, 38 (as seen in the circumferential direction of the driving member 33) and has a circumferential groove which receives and guides the adjacent marginal portion of the lever 30. In addition, the projection 41 cooperates with the lever 30 to limit the extent to which the levers 25, 30 can be pivoted relative to each other under the action of the tension spring 40. This spring indirectly biases the eccentrics 60, 61 of the two pintles (through the medium of the respective levers 25 and 30) so as to eliminate play between the teeth of the respective pairs of gears 17, 18 as well as the clearances which are attributable to other factors, such as manufacturing tolerances and others. Thus, if the tolerances are more pronounced, the tension spring 40 simply changes the distance between the second arms 38, 39 of the levers 25, 30. The distance between the surfaces 42 and 43 flanking the ends of the recess 37 in the driving member 33 determines the maximum extent of compensation for the aforediscussed tolerances and play between the teeth of the two pairs of gears 17 and 18.

When the driving member 33 is turned in a clockwise direction, the surface 43 in the recess 37 entrains the arm 35 of the lever 25 in the same direction so that the lever 25 turns the eccentric 60 and hence the entire pintle 19 of the hinge joint 12. The tension spring 40 pulls the lever 30 in the same direction so that the eccentric 61 and the pintle 20, 14 also turn in a clockwise direction. In other words, the tension spring 40 ensures that the eccentrics 60, 61 of the torque receiving portions 21, 22 are maintained in predetermined angular positions relative to each other to ensure the elimination of play and clearances. The tension spring 40 not only eliminates that play and/or those clearances which exist when the driving member 33 is idle but also compensates for changes of such play and clearances which develop as the operator turns the driving member 33 in a sense to change the inclination of the back rest 11 of the seat relative to the base 10.

If the driving member 33 is turned in a counterclockwise direction, the surface 42 in the recess 37 engages the arm 36 of the lever 30 and causes the two-piece pintle 20, 14 to share such angular movement of the driving member. The tension spring 40 then entrains the arm 35 so that the lever 25 turns with the lever 30 and causes the pintle 19 to turn in a counterclockwise direction. The aforediscussed play and/or clearances do not influence the magnitude of force which is required to turn the driving member 33 in a clockwise or counterclockwise direction, i.e., the presence of such play and/or clearances does not necessitate the exertion of a greater force or the application of a lesser force than in the absence of the torque transmitting levers 25, 30 and tension spring 40. This is due to the fact that the play and clearances are compensated for by the tension spring 40 so that no constraining or like forces develop during turning of the driving member 33.

An advantage of the improved chair is that the tension spring 40 enables the levers 25, 30 to tend to turn the eccentrics 60, 61 of the two hinge joints 12, 13 relative to each other to thus compensate for changes of play between the mating teeth and/or for changes of clearances between the rotating parts and their bearings while the driving member 33 is rotated in order to change the inclination of the back rest 11. This ensures that the transfer of torque from the driving member 33 to each of the pintles 19 and 20, 14 is smooth and rotation of the pintles does not require the application of a pronounced force because the tension spring 40 does not contribute to higher power requirements for rotation of the driving member 33. Moreover, the shaft 14 of the pintle 20, 14 of the hinge joint 13 is a one-piece body which need not be provided with external splines and need not employ an internally grooved sleeve or muff of the type disclosed in the aforediscussed published German patent application of Barghodziej et al. The driving member 33 need not be positively connected to either of the pintles but is merely held against axial movement away from the pintle 19 of the hinge joint 12.

As will be explained with reference to FIG. 8, the relatively simple driving member 33 can be replaced with more complex driving means for the pintles 19, and 20, 14. Furthermore, if the hand wheel is to be mounted at a location other than in axial alignment with the pintles of the hinge joints 12 and 13, the torque transmitting connection between the hand wheel and the levers 25, 30 can comprise a toothed belt, an endless chain, a train of gears or the like.

The transmissions of FIG. 2 are the simplest types of transmissions which are normally used in seats of the type employing the improved hinge joints and the improved means for changing the inclination of the back rest 11. Each of these transmissions merely comprises a spur gear 17 and an internal gear 18. The spur gears 17 are maintained in mesh with the respective internal gears 18 by the corresponding eccentrics 60 and 61. The eccentricity of each eccentric at least matches or exceeds half the radial dimension of a tooth. When the hinge joints employ such simple gear transmissions, the pivotable components 15 of the hinge joints perform angular as well as radial movements when the driving member 33 is rotated in order to change the angular positions of the pintles 19 and 20, 14. The extent of radial movement of the components 15 depends upon the eccentricity of the eccentrics 60 and 61.

The seat of FIGS. 1 to 4 can be simplified by omitting the second arms 38, 39 of the levers 25, 30 and by installing the tension spring 40 (or other suitable biasing means) in such a way that it operates between the arms 35 and 36.

Figure 5:
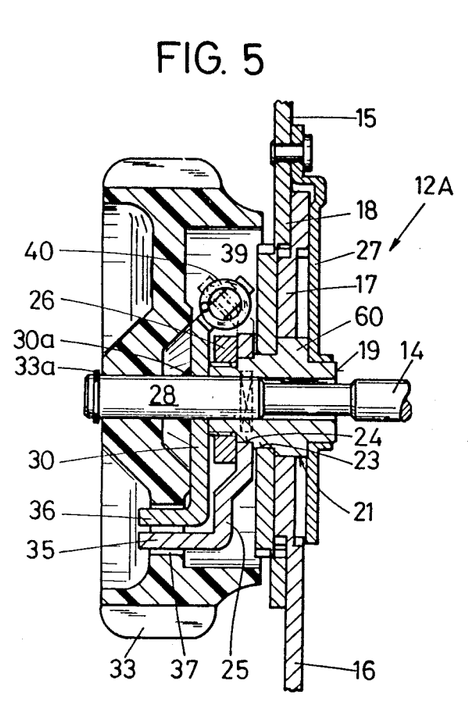
FIG. 5 is a central sectional view of a modified hinge joint wherein one of the torque transmitting elements is welded to the respective pintle.

FIG. 5 shows in detail one hinge joint of a modified chair and the second portion (shaft 14) of the other hinge joint. The left-hand end portion 28 of the shaft 14 is a cylinder which extends through and rotatably supports the driving member 33. The torque transmitting element or lever 30 is welded (as at 30a) directly to the end portion 28 of the shaft 14. A split ring 33a is provided to hold the driving member 33 on the end portion 28 of the shaft 14 so that the driving member can turn relative to the shaft and lever 30 and vice versa. In all other respects, the hinge joint 12A which is shown in FIG. 5 is or can be identical with the hinge joint 12 of FIG. 2, and the other hinge joint (including the shaft 14) can be identical with the hinge joint 13 of FIG. 2.

Figure 6:
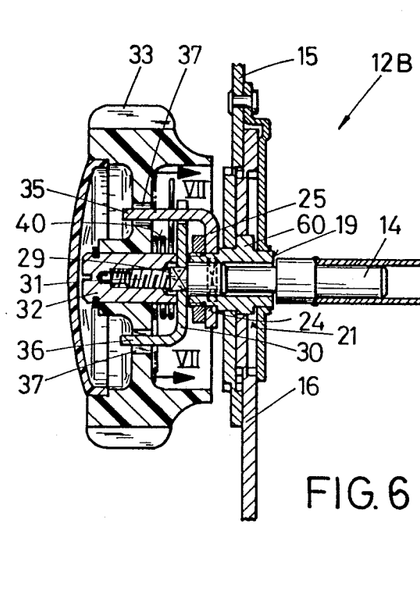
FIG. 6 is a central sectional view of a further hinge joint wherein the torque transmitting elements are coupled to each other by a torsion spring.
Figure 7:
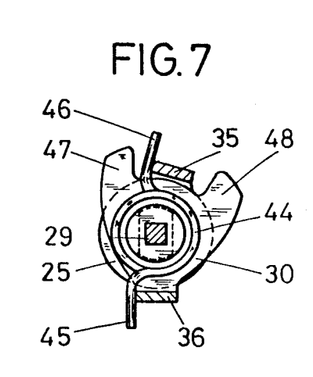
FIG. 7 is a fragmentary sectional view substantially as seen in the direction of arrows from the line VII—VII FIG. 6.

FIGS. 6 and 7 show one hinge joint 12B of a third chair which is similar to the chair of FIGS. 1 to 4 except that it employs a modified yieldable biasing means in the form of a torsion spring 40' whose legs 45, 46 bear against the arms 35, 36 of the levers 25, 30 and which has one or more convolutions 44 surrounding the shaft 14 of the pintle of the non-illustrated hinge joint. The convolutions 44 spacedly surround an externally threaded stub 31 which forms an integral part of the shaft 14 and mates with an internally threaded sleeve 32 constituting a bearing for the hub of the rotary driving member 33. The lever 30 non-rotatably surrounds the polygonal portion 29 of the shaft 14 and has an arm 36 which extends into the recess 37 of the driving member 33. The arm 35 of the lever 25 is disposed between two circumferentially spaced-apart stops 47, 48 which are provided on the lever 30 diametrically opposite the arm 36. The purpose of the stops 47, 48 is to determine the maximum extent of angular movability of the levers 25 and 30 relative to each other. When the arm 35 of the lever 25 is located substantially midway between the stops 47 and 48, it is located substantially diametrically opposite the arm 36 of the lever 30 (with reference to the axis of the shaft 14).

It is clear that the stops 47, 48 can be provided on the lever 25 and such stops then flank the arm 36 of the lever 30. The distance between the stops 47, 48 and the width of the arm 35 determine the maximum degree of angular movability of the levers 25, 30 relative to each other.

In all other respects, the seat which embodies the structure of FIGS. 6 and 7 can be identical with the seat of FIGS. 1 to 4.

An advantage of the seat which embodies the structure of FIGS. 6 and 7 is that it can employ relatively simple torque transmitting levers 25, 30 each of which has a single arm (35, 36) because the legs 45, 46 of the torsion spring 40' are caused to directly engage the arms 35 and 36, i.e., the second arms of the levers can be omitted.

Figure 8:
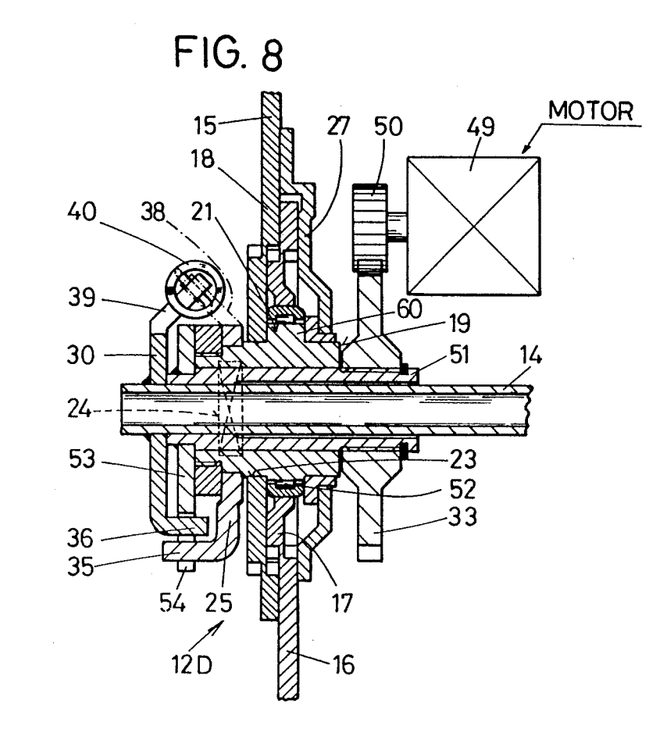
FIG. 8 is a central sectional view of a hinge joint wherein the pintle can be rotated by a driving member employing an electric motor.

FIG. 8 shows a portion of a fourth chair wherein the driving member includes an electric motor 49, a pinion 50 on the output shaft of the motor 49, a gear 33' which mates with the pinion 50, a sleeve 51 which is non-rotatably surrounded by the gear 33', and a substantially disc-shaped portion 53 which is non-rotatably affixed to the sleeve 51 (such as by welding) and is provided with a recess 54 for the arms 35, 36 of the torque transmitting levers 25, 30. The motor 49 is preferably disposed between the two hinge joints (FIG. 8 shows all details of the hinge joint 12D which corresponds to the hinge joint 12 of FIGS. 1–4 and a portion of the shaft 14 of the other hinge joint) and, to this end, it is desirable to rearrange the parts of the fully illustrated hinge joint 12D. For example, the motor 49 can be installed directly in or beneath the body supporting portion or base of the seat which embodies the structure of FIG. 8.

The sleeve 51 of the driving member including the motor 49 is rotatable on the shaft 14, and the pintle 19 is rotatably mounted on the sleeve 51. The eccentric 60 of the pintle 19 is surrounded by the spur gear 17 of the fixed component 16 of the hinge joint 12D, and this hinge joint further includes an antifriction bearing 52 (e.g., a needle bearing) which is interposed between the eccentric 60 and the spur gear 17. The internal gear 18 is part of the pivotable component 15 which is mounted on the concentric portion 23 of the pintle 19. The arms 38, 39 of the levers 25, 30 are coupled to each other by a tension spring 40. The lever 25 is non-rotatably mounted on the polygonal portion 24 of the pintle 19 and cooperates with the lever 30 in the same way as described in connection with the seat of FIGS. 1 to 4.

The motor 49 can rotate the disc-shaped portion 53 of the driving member in a clockwise or in a counterclockwise direction, depending on the selected direction of tilting or pivoting of the back rest. The controls for operating the motor 49 are not shown in FIG. 8; such controls can be located within reach of the person occupying the seat. It will be noted that the major part of the composite driving member including the motor 49, the pinion 50, the gear 33', the sleeve 51 and the disc-shaped portion 53 is located at the inner side of the hinge joint 12D, i.e., between the two hinge joints; only the disc-shaped portion 53 is located at that side of the hinge joint 12D which faces away from the other hinge joint. This renders it possible to reduce the bulk of that portion of the hinge joint 12D which extends away from the respective side of the base of the seat. As a rule, there is ample room for the motor 49 beneath the base of the seat, and such motor is adequately protected and concealed from view.

Figure 9:
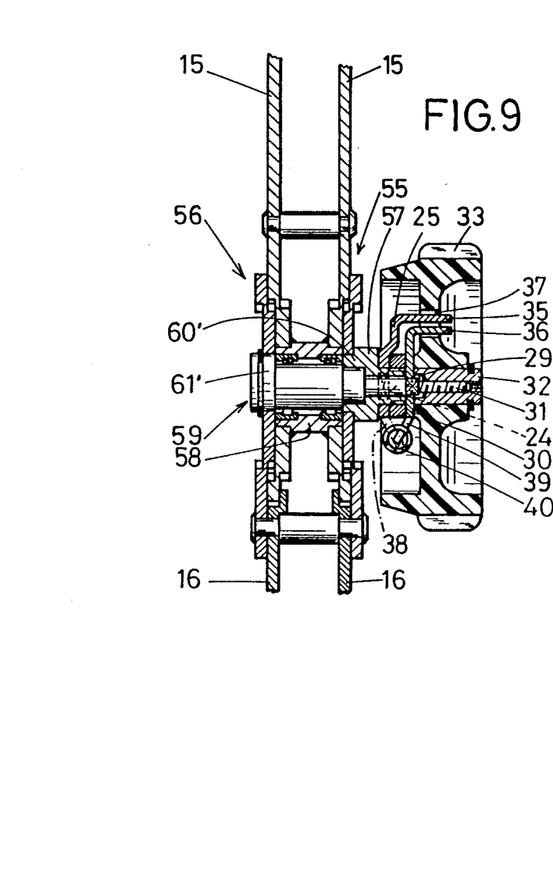
FIG. 9 is a central sectional view of two hinge joints which are disposed at one and the same side of the body supporting portion of a seat.

The heretofore described embodiments of the improved seat comprise single pairs of hinge joints, i.e., one single joint at each side (10a, 10b) of the base 10. FIG. 9 shows a portion of a modified seat wherein two similar hinge joints 55 and 56 are disposed at one and the same side of the base (the latter is assumed to be located to the left of the hinge joints which are shown in FIG. 9). The structure of FIG. 9 can be used with advantage in chairs which are designed to offer an even higher degree of safety to the occupant, particularly in the event of an accident. The hinge joints 55, 56 of FIG. 9 can transmit pronounced forces from the base to the back rest of the seat (or vice versa) in the event of practically any form of collision or other accident. In order to avoid undesirable play between the mating teeth of the two gear transmissions which are shown in FIG. 9, the hinge joints 55, 56 also comprise torque transmitting elements in the form of levers 25, 30 with substantially axially parallel arms 35, 26 extending into the recess 37 of the hand wheel 33 which constitutes the rotary driving member of the means for changing the inclination of the back rest.

Each of the hinge joints 55, 56 comprises a fixedly mounted first component or leaf 16 which is secured to the base of the seat, and a second component or leaf 15 which is affixed to the back rest. The hinge joint 56 is disposed between the base and the hinge joint 55, and the latter comprises a sleeve-like pintle 57 with an eccentric 60' which is surrounded by the respective component 16. The pintle 57 comprises a polygonal portion 24 which is non-rotatably coupled to the torque transmitting lever 25. The components 15 of the hinge joints 55 and 56 are rigidly connected to each other by a sleeve 58 which is rotatably journalled (e.g., by one or more antifriction roller bearings) on a concentric portion of a pintle 59 of the hinge joint 56. The pintle 59 has an eccentric torque receiving portion 61' which is surrounded by the component 16 of the hinge joint 56. The pintle 59 has several axially spaced apart portions of different diameters and extends into the pintle 57 of the hinge joint 55. A polygonal portion 29 of the pintle 59 extends beyond the pintle 57 and is non-rotatably connected with the torque transmitting element or lever 30. The end portion of the pintle 59 constitutes an externally threaded stub 31 which mates with an internally threaded sleeve 32 rotatably supporting the driving member 33. The sleeve 32 can be said to constitute a nut which holds the lever 30 against movement away from the components 15, 16 of the hinge joints 55 and 56. The recess 37 for the arms 35, 36 of the levers 25, 30 can be configured in a manner as shown in FIG. 3. The second arms 38 and 39 of the levers 25, 30 are coupled to each other by a tension spring 40, for example, in the same way as shown in FIG. 3. The tension spring 40 eliminates play and clearances in the same way as described in connection with FIGS. 1 to 4.

In most instances, it suffices to provide a seat with two hinge joints which are disposed at opposite sides of the base and each of which employs a gyratory or wobbling transmission. The structure of FIG. 9 adds reliability and strength to the seat, especially if one side of the back rest is connected with one end of a safety belt. Of course, the seat which utilizes the structure of FIG. 9 can further employ a third hinge joint at the other side of the base, and such third hinge joint can include a pintle which receives torque from the pintle 59 or 57.

Figure 10:
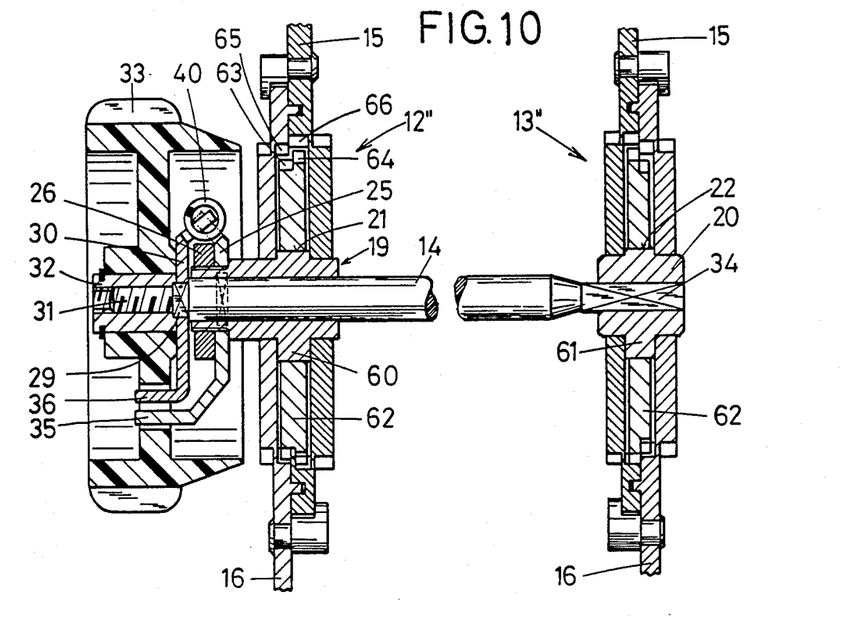
FIG. 10 is a central sectional view of the hinge joints in a further seat wherein each leaf-like component of each of the two hinge joints has an internal gear.

Referring to FIG. 10, there is shown a portion of a seat with two hinge joints 12'', 13'' which can be mounted at opposite sides of a base in a manner as shown in FIG. 1. The pintle 19 of the left-hand hinge joint 12'' has an eccentric 60 is surrounded by a spur gear 62, and a second spur gear 62 surrounds the eccentric 61 of the pintle 20, 14 forming part of the hinge joint 13''. Each of the spur gears 62 has two different annuli of teeth 63 and 64. The teeth 63 mate with certain teeth of internal gears 65 which are provided on the respective components 16, and the teeth 64 of the spur gears mate with certain teeth of internal gears 66 of the respective components 15. Each internal gear 65 has m+n teeth wherein n is the number of teeth 63 and m is a whole number including one. The same ratio of the numbers of teeth is selected for the teeth of the internal gear 66 and the teeth 64. The eccentrics 60, 61 maintain the respective spur gears 62 in mesh with the corresponding pairs of internal gears 65, 66 so that the components 15 are caused to pivot relative to the associated components 16 in response to turning of the driving member 33, i.e., in response to angular movement of the pintles 19 and 20, 14. The elimination of play and clearances is effected by the torque transmitting levers 25, 30 on the pintles 19 and 20, 14 and by a tension spring 40 in the same way as described in connection with FIGS. 1 to 4.

The seat which embodies the structure of FIG. 10 exhibits the advantage that the components 15 need not move radially of the pintles in response to rotation of the driving member 33. This is due to the fact that each of the components 15, 16 in each of the hinge joints 12", 13" is provided with an internal gear and the number of teeth in the internal gear of the component 15 deviates from the number of teeth in the internal gear of the component 16. The eccentrics 60 and 61 again serve to maintain the teeth of the respective spur gears 62 in mesh with the teeth of the corresponding pairs of internal gears.

Figure 11:
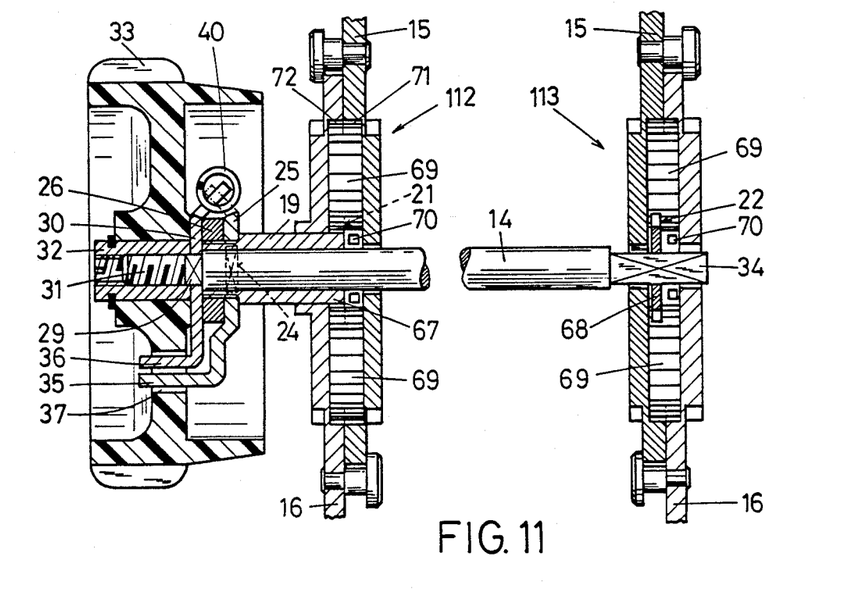
FIG. 11 is a central sectional view of the hinge joints in an additional seat wherein each hinge joint comprises a planetary transmission.

Referring finally to FIG. 11, there are shown two hinge joints 112 and 113 each of which comprises a planetary transmission instead of a relatively simple gear transmission of the type shown in FIGS. 2, 5, 6, 8, 9 or 10. The pintle 19 of the hinge joint 112 is a sleeve which surrounds a portion of the shaft 14, the latter constituting the pintle of the hinge joint 13. That end portion (21) of the sleevelike pintle 19 which is remote from the nut 26 for the torque transmitting lever 25 comprises or constitutes a sun gear 67. The part 22 on the polygonal portion 34 of the shaft 14 carries a second sun gear 68. Each of the sun gears 67, 68 mates with at least one planet pinion 69. For example, the components 15, 16 of each of the hinge joints 12, 13 can define a chamber for four planet pinions 69. The planet pinions 69 of each transmission are preferably mounted in and maintained in predetermined positions relative to each other by suitable cages 70 in the respective chambers. Each cage 70 surrounds only selected portions of the respective planet pinions 69 so that each of these pinions can mate with the respective sun gear 67 or 68 as well as with the respective internal gears 71, 72 of the corresponding components 15, 16. In other words, each planet pinion 69 can mate with two internal gears 71, 72. The internal gears 71, 72 of each planetary transmission can comprise different numbers of gear teeth but can have identical pitch circles. This ensures that the components 15 of each of the two hinge joints 12, 13 can turn relative to the respective components 16 in response to rotation of the respective sun gears 67, 68. The torque transmitting levers 25, 30 are non-rotatably coupled to the pintles 19 and 14, respectively, and have arms 35, 36 which extend into the recess 37 of the driving member 33. The second arms of the levers 25, 30 are coupled to each other by a tension spring 40, preferably in the same way as shown in FIG. 3. The lever 25 is directly connected to the portion 21 of the pintle 19, and the lever 30 is mounted on the polygonal portion 29 of the pintle (shaft) 14.

The structure which is shown in FIG. 11 also exhibits the advantage that the components 15 need not move radially of the pintles in response to rotation of the driving member 33. This is due to the fact that, even though each of the components 15, 16 has an internal gear, the pitch diameters of both internal gears in each of the hinge joints are identical.

The invention can be embodied in all types of seats wherein each of the hinge joints comprises components or leaves (15) which share the pivotal movements of the back rest and receive torque by way of gear transmissions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A seat, particularly for use in motor vehicles, comprising a body supporting portion; a back rest; first and second hinge joints adjustably coupling said back rest to said body supporting portion, each of said hinge joints comprising a first component rigid with said body supporting portion, a second component rigid with said back rest, and a pintle angularly movably mounting the second component on the respective first component, said pintles being coaxial with each other; and means for changing the inclination of said back rest relative to said body supporting portion including a rotary driving member, a first torque transmitting element non-rotatably mounted on one of said pintles and rotatable by said driving member, a second torque transmitting element non-rotatably mounted on the other of said pintles, rotatable by said driving member and turnable relative to said first torque transmitting element, and means for yieldably biasing said torque transmitting elements toward predetermined angular positions relative to each other.

2. The seat of claim 1, wherein each of said torque transmitting elements includes a lever and each of said pintles includes a torque receiving portion which is non-rotatably connected with the respective lever.

3. The seat of claim 1, wherein one component of each of said hinge joints comprises a spur gear with n teeth and the other component of each hinge joint comprises an internal gear mating with the respective spur gear and having m+n teeth, m being a whole number including one.

4. The seat of claim 1, wherein said driving member is rotatably mounted on one of said pintles and each of said torque transmitting elements includes a lever having an arm coupled to said driving member.

5. The seat of claim 1, wherein each of said pintles includes an eccentric which receives torque from the respective torque transmitting element in response to rotation of said driving member.

6. The seat of claim 1, wherein said driving member has a recess and said torque transmitting elements have portions extending into said recess with angular play so that the dimensions of said recess determine the maximum extent of angular movability of said torque transmitting elements and of the respective pintles relative to each other.

7. The seat of claim 6, wherein said driving member includes a substantially disc-shaped portion and said recess is provided in said disc-shaped portion.

8. The seat of claim 6, wherein each of said hinge joints further comprises a gear transmission between the respective first and second components, each of said transmissions including gears having teeth mating with a play which is determinative of the extent of angular movability of said torque transmitting elements relative to each other.

9. The seat of claim 1, wherein each of said torque transmitting elements includes an arm and said biasing means includes a spring which operates between said arms.

10. The seat of claim 1, wherein said body supporting portion has a first side and a second side opposite said first side, said hinge joints being disposed at the respective sides of said body supporting portion.

11. The seat of claim 10, wherein one of said pintles is integral with the respective torque transmitting element and the other of said pintles is rotatable on said one pintle.

12. The seat of claim 11, wherein said one pintle has a first portion at the respective side of said body supporting portion and a second portion which is non-rotatably connected to said first portion and extends between the first and second sides of said body supporting portion.

13. The seat of claim 10, wherein one of said pintles has a first portion at the respective side of said body supporting portion and a second portion extending between the first and second sides of said body supporting portion, said driving member comprising a sleeve which is rotatably mounted on the second portion of said one pintle and a disc-shaped portion which is non-rotatably secured to said sleeve, said torque transmitting elements being connected with and being arranged to receive torque from said disc-shaped portion in response to rotation of said driving member.

14. The seat of claim 1, wherein each of said hinge joints further comprises a planetary transmission having a sun gear which is non-rotatably connected with the respective pintle, an internal gear provided on each of the respective components, and at least one planet pinion mating with the respective sun gear and with the respective internal gears.

15. The seat of claim 14, wherein the internal gears of each of said planetary transmissions have different numbers of teeth.

16. The seat of claim 1, wherein said biasing means comprises at least one tension spring.

17. The seat of claim 1, wherein said biasing means comprises at least one torsion spring.

18. The seat of claim 17, wherein said torque transmitting elements have arms which are disposed substantially diametrically opposite each other with reference to the common axis of said pintles and said at least one torsion spring has portions which bear against the arms of said torque transmitting elements.

19. The seat of claim 18, wherein said at least one torsion spring has at least one convolution surrounding one of said pintles.

20. The seat of claim 18, wherein one of said torque transmitting elements further comprises a pair of stops and the arm of the other of said torque transmitting elements is disposed between said stops and has limited freedom of movement relative to said stops in the circumferential direction of said pintles.

21. The seat of claim 1, wherein said hinge joints are disposed at one side of said body supporting portion and the pintle of said first hinge joint comprises a shaft having an eccentric surrounded by the first and second components of said first hinge joint, the pintle of said second hinge joint comprising a sleeve which rotatably surrounds said shaft, one of said torque transmitting elements being non-rotatably connected with said shaft and the other of said torque transmitting elements being non-rotatably connected with said sleeve.

22. The seat of claim 21, wherein said driving member is rotatably mounted on said shaft.

23. The seat of claim 22, wherein said first hinge joint is disposed between said side of said body supporting portion and said second hinge joint.

24. The seat of claim 1, wherein said driving member comprises a prime mover which is disposed between said hinge joints.

* * * * *